United States Patent
Mori et al.

(10) Patent No.: US 9,317,077 B2
(45) Date of Patent: Apr. 19, 2016

(54) ELECTRONIC DEVICE PROVIDED WITH COVER

(71) Applicant: Panasonic Intellectual Property Management Co., Ltd., Osaka-shi, Osaka (JP)

(72) Inventors: Takeshi Mori, Osaka (JP); Masato Murakata, Osaka (JP); Masashi Toyota, Osaka (JP); Jun Sato, Osaka (JP)

(73) Assignee: Panasonic Intellectual Property Management Co., Ltd.

( * ) Notice: Subject to any disclaimer, the term of this patent is extended or adjusted under 35 U.S.C. 154(b) by 0 days.

(21) Appl. No.: 14/677,572

(22) Filed: Apr. 2, 2015

(65) Prior Publication Data

US 2015/0212554 A1    Jul. 30, 2015

Related U.S. Application Data

(63) Continuation of application No. 13/024,074, filed on Feb. 9, 2011, now abandoned.

(30) Foreign Application Priority Data

Feb. 26, 2010   (JP) .................................. 2010-042659

(51) Int. Cl.
  *H05K 5/03*   (2006.01)
  *G06F 1/18*   (2006.01)
  *G06F 1/16*   (2006.01)

(52) U.S. Cl.
  CPC .............. *G06F 1/182* (2013.01); *G06F 1/1616* (2013.01); *G06F 1/1656* (2013.01); *G06F 1/1679* (2013.01); *G06F 1/1681* (2013.01)

(58) Field of Classification Search
  CPC ...... G06F 1/1656; G06F 3/0488; G06F 1/203;
  G06F 1/1626; G06F 15/0216; G06F 1/1616;
  G06F 1/182; G06F 1/1613; G06F 1/1637;
  G06F 1/1679; G06F 1/1681; H05K 5/061;
  H05K 5/0247; H05K 7/20409; H05K 5/02;
  H05K 5/03; H05K 5/00; H05K 5/0069
  USPC ............. 361/679.01, 679.02, 679.55–679.58,
  361/679.26, 679.27
  See application file for complete search history.

(56) References Cited

U.S. PATENT DOCUMENTS

| | | |
|---|---|---|
| 1,980,207 A | 11/1934 | Kehl |
| 4,225,970 A | 9/1980 | Jaramillo et al. |

(Continued)

FOREIGN PATENT DOCUMENTS

| | | |
|---|---|---|
| CN | 201119175 Y | 9/2008 |
| CN | 201869967 U | 6/2011 |

(Continued)

*Primary Examiner* — Anthony Haughton
*Assistant Examiner* — Ingrid Wright
(74) *Attorney, Agent, or Firm* — Hamre, Schumann, Mueller & Larson, P.C.

(57) ABSTRACT

An electronic device includes: a first housing 1; a cover 11 capable of covering a portion of the first housing 1 to be covered; and a waterproofing member 12 placed around the portion to be covered. The cover 11 is displaceable between a closed position at which the cover covers the portion to be covered and an open position at which the cover opens the portion to be covered. The cover 11 is in contact with the waterproofing member 12 when it is at the closed position. Even if the number of terminals increases, since the waterproofing member 12 is provided on the first housing 1, the single waterproofing member can render all of the terminals waterproof. Thus, it is possible to reduce the number of components and to reduce the number of assembling steps.

11 Claims, 4 Drawing Sheets

(56) References Cited

U.S. PATENT DOCUMENTS

| | | |
|---|---|---|
| 4,244,044 A | 1/1981 | Olsson |
| 4,675,782 A | 6/1987 | Hibbert et al. |
| 4,817,967 A | 4/1989 | Belter |
| 5,351,176 A | 9/1994 | Smith et al. |
| 5,435,780 A | 7/1995 | Ayles |
| 5,574,625 A | 11/1996 | Ohgami et al. |
| 5,583,742 A | 12/1996 | Noda et al. |
| 5,634,807 A | 6/1997 | Saito |
| 6,038,087 A | 3/2000 | Suzuki et al. |
| 6,499,327 B1 | 12/2002 | Sugimoto |
| 6,588,335 B1 | 7/2003 | Bourrieres et al. |
| 6,697,258 B1 | 2/2004 | Muhlfeld et al. |
| 6,942,153 B1 * | 9/2005 | Yuan et al. ............ 235/472.01 |
| 6,954,361 B2 | 10/2005 | Taubert et al. |
| 7,075,781 B2 | 7/2006 | Peng |
| 7,563,113 B2 | 7/2009 | Sheng |
| 7,704,085 B1 | 4/2010 | Chang |
| 7,732,543 B2 | 6/2010 | Loch et al. |
| 7,762,861 B2 | 7/2010 | Verfuerth et al. |
| 7,789,437 B2 | 9/2010 | Sheng |
| 7,869,843 B2 | 1/2011 | Ladouceur et al. |
| 7,936,566 B2 | 5/2011 | Shigyo et al. |
| 8,089,757 B2 | 1/2012 | Chen et al. |
| 8,164,899 B2 | 4/2012 | Yamaguchi et al. |
| 8,199,464 B2 | 6/2012 | Zuo et al. |
| 8,934,224 B2 | 1/2015 | Iwamoto et al. |
| 2003/0125631 A1 | 7/2003 | Amano |
| 2004/0047244 A1 | 3/2004 | Iino et al. |
| 2006/0007647 A1 | 1/2006 | Peng |
| 2007/0199804 A1 | 8/2007 | Joseph et al. |
| 2008/0037205 A1 | 2/2008 | Arisaka et al. |
| 2009/0219676 A1 | 9/2009 | Murakata |
| 2010/0033913 A1 | 2/2010 | Cao |
| 2010/0085691 A1 | 4/2010 | Yeh et al. |
| 2010/0110653 A1 | 5/2010 | Hisada |
| 2010/0313485 A1 | 12/2010 | Kuo |
| 2011/0013372 A1 | 1/2011 | Kang |
| 2011/0075338 A1 | 3/2011 | Tang et al. |
| 2011/0211300 A1 | 9/2011 | Mori et al. |
| 2012/0050077 A1 | 3/2012 | Shih et al. |
| 2012/0099266 A1 | 4/2012 | Reber et al. |
| 2013/0044420 A1 | 2/2013 | Iwamoto et al. |

FOREIGN PATENT DOCUMENTS

| | | |
|---|---|---|
| CN | 202308570 U | 7/2012 |
| JP | 10-284855 | 10/1998 |
| JP | 2005-347432 | 12/2005 |
| JP | 2007-279498 | 10/2007 |
| JP | 2009-003649 | 1/2009 |
| JP | 2009-054725 | 3/2009 |
| JP | 2009-223432 | 10/2009 |
| JP | 4538526 B | 9/2010 |
| KR | 20110007782 | 1/2011 |

* cited by examiner

ELECTRONIC DEVICE PROVIDED WITH COVER

BACKGROUND OF INVENTION

1. Field of the Invention

The present application relates to an electronic device provided with a cover.

2. Description of Related Art

In recent years, electronic devices, such as notebook computers, have been introduced on the market with improved waterproofness, dripproofness and dustproofness in view of the use in a variety of outdoor environments. For such electronic devices, a cover may be provided to cover a terminal to which a cable or the like can be connected because the adhesion of liquid, dust, etc. to the terminal could lead to electronic device failure.

JP 2005-347432 A discloses a waterproofing cover that is fitted to a housing portion. The waterproofing cover is composed of an operating case and a movable member. The operating case is operated to attach/detach the waterproofing cover to/from the opening of the housing portion and the movable member is provided inside the operating case and is movable in a movable space. The moveable member is provided with retractable lugs. In response to the movement of the movable member in the movable space, the retractable lugs stick out/retract through windows formed in a sidewall of the operating case and are fitted to/removed from an engagement groove formed in the inner radius wall of the housing portion. The moveable member can be moved by operating a boss through an operating window formed in the operating case.

In the configuration disclosed in JP 2005-347432 A, a gasket for ensuring the waterproofness of the device is provided on the cover at the interfacial portion between the cover and the opening. When covering a plurality of housing portions with covers using this configuration, independent gaskets need to be provided for the respective covers. When gaskets are provided independently for the respective covers, the number of men-hours needed to assemble them increases.

SUMMARY OF THE INVENTION

The electronic device disclosed in the present application includes: a housing; a cover capable of covering a portion of the housing to be covered; and a waterproofing member placed around the portion to be covered. The cover is displaceable between a closed position at which the cover covers the portion to be covered and an open position at which the cover opens the portion to be covered, and the cover is in contact with the waterproofing member when the cover is at the closed position.

DETAILED DESCRIPTION OF THE EMBODIMENT

An electronic device according to one embodiment includes: a housing; a cover capable of covering a portion of the housing to be covered; and a waterproofing member placed around the portion to be covered. The cover is displaceable between a closed position at which the cover covers the portion to be covered and an open position at which the cover opens the portion to be covered, and the cover is in contact with the waterproofing member when the cover is at the closed position.

The electronic device may be modified such that the waterproofing member has elasticity, and when the cover is at the closed position, the cover is in contact with the waterproofing member and deforms the waterproofing member. As a result of configuring the electronic device in this way, the waterproofness be improved further.

The electronic device may be modified such that a protection member is provided on the waterproofing member at a part with which the cover can come into contact. As a result of configuring the electronic device in this way, it is possible to prevent the waterproofing member from getting damaged when a user tries to connect a plug to the terminal but accidentally bumps the plug against the waterproofing member.

The electronic device may be modified such that the portion to be covered includes a main portion and a subportion to be covered, and the waterproofing member is placed around the main portion and the subportion to be covered. As a result of configuring the electronic device in this way, an increase in the number of terminals does not lead to an increase the number of the waterproofing member. Thus, it is possible to reduce the number of components and to reduce the cost. Further, since the number of steps during the assembly can be reduced, the assembly process can be improved.

Embodiment

1. Configuration of Electronic Device

Figure 1:
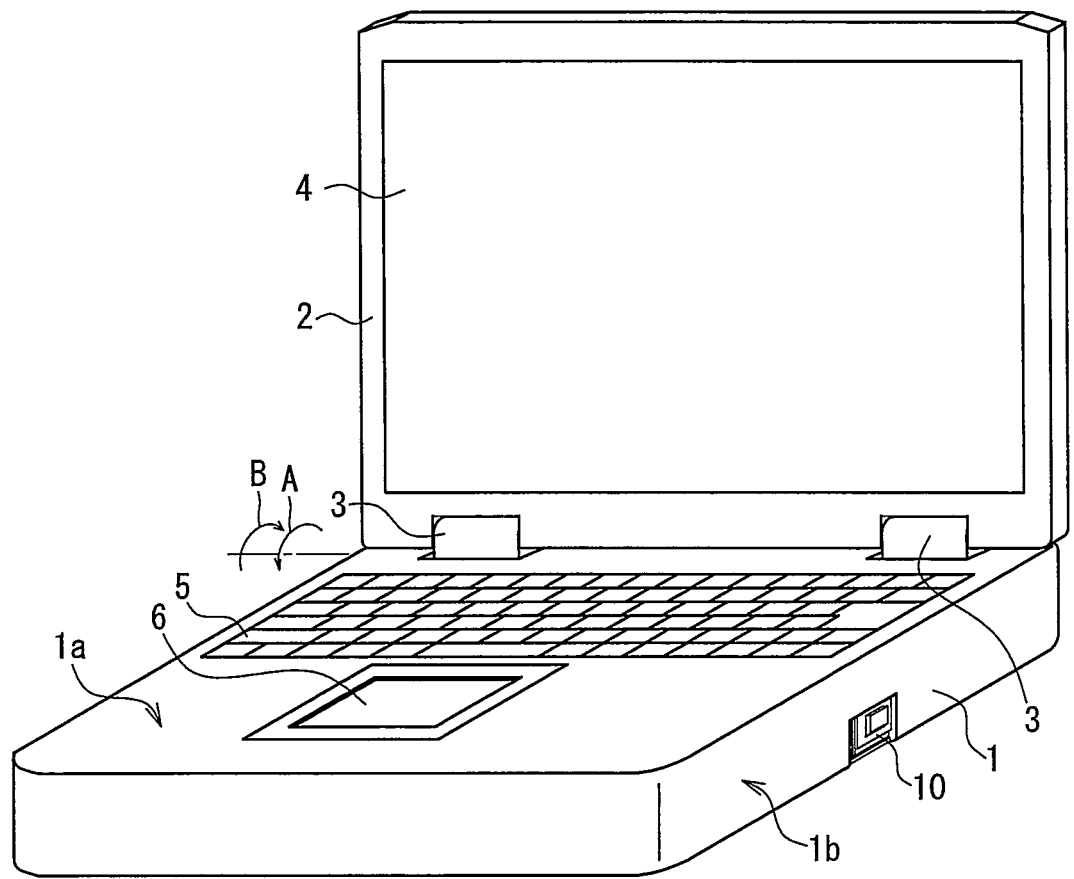
FIG. 1 is a perspective view of a notebook computer according to one embodiment.

FIG. 1 is an external view of a notebook computer as one example of the electronic device according to the present embodiment. Although the notebook computer is taken in the present embodiment as one example of the electronic device, it may be any device that is at least provided with a cover for covering a terminal or the like.

As shown in FIG. 1, the notebook computer includes a first housing 1 and a second housing 2. The first housing 1 includes, for example, a hard disk drive and a circuit board on which a variety of electronic components are mounted. The second housing 2 includes a display panel 4 (liquid crystal display). The first housing 1 and the second housing 2 are each supported rotatably by hinges 3. Each of the hinges 3 includes a spindle for supporting the first housing 1 and the second housing 2 rotatably in the direction indicated by the arrow A or B. A keyboard 5 and a pointing device 6 are placed on a top face 1a of the first housing 1. A terminal portion 10 is provided on a side face 1b of the first housing 1.

2. Configuration of Terminal Portion

Figure 2:
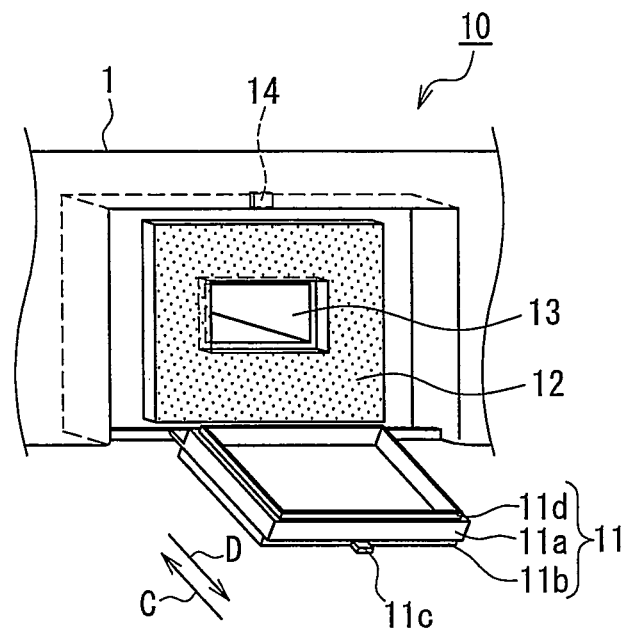
FIG. 2 is a perspective view of principle components of a terminal portion.

FIG. 2 is a perspective view of the terminal portion 10. The terminal portion 10 includes a cover 11, a waterproofing member 12, a terminal 13 and a concave portion 14.

The cover 11 is displaceable between a closed position at which the cover 11 covers the terminal 13 and an open position at which the cover 11 opens the terminal 13. The cover 11 is supported rotatably with respect to the first housing 1. The cover 11 includes a cover portion 11a, a sliding member 11b, a first protrusion 11c, a rib 11d and a supporting portion 11e. The cover portion 11a has a size that is at least enough for the cover 11 to cover the terminal 13. The sliding member 11b is placed on the top face of the cover portion 11a slidably in the plane direction of the top face (the direction indicated by the arrow C or D). The first protrusion 11c is formed integrally with an end of the sliding member 11b. The rib 11d is formed on the undersurface (the underside of the top face) of the cover portion 11a and sticks out from the undersurface. The rib 11d is formed at a position where it at least can come into contact with the waterproofing member 12 when the cover 11 is displaced to the closed position. The rib 11d is formed integrally with the cover portion 11a. The rib 11d is formed to at least surround the terminal 13 when the cover 11 is displaced to the closed position. The supporting portion 11e is formed integrally with the cover 11a. One end of the supporting portion 11e is fixed to the first housing 1. The supporting portion 11e supports the cover portion 11a and its accompanying members rotatably. The supporting member 11e preferably has a small thickness so that the cover portion 11a and its accompanying members can be rotated smoothly.

The waterproofing member 12 is bonded to the side face 1b of the first housing 1 at a part surrounding at least the terminal 13. The waterproofing member 12 is made of a material capable of ensuring the waterproofness of the terminal 13. For example, the waterproofing member 12 can be made of silicone foam. Although the waterproofing member 12 can be bonded to the first housing 1 with adhesive tape or the like, the waterproofing member 12 preferably is bonded to the first housing 1 by waterproof bonding means in order to prevent at least the entry of liquid through between the waterproofing member 12 and the first housing 1. At the junction between the cover 11 and the first housing 1, extension of the waterproofing member 12 to the interfacial portion between the cover 11 and the first housing 1 allows the cover 11 to be fixed to the first housing 1 by screws or the like.

The terminal 13 is placed in the first housing 1. An external cable or the like can be connected to the terminal 13 through an opening formed in the side lace 1b. In the example shown in FIG. 2, the terminal 13 is a USB (Universal Serial Bus) terminal.

The concave portion 14 is formed in the first housing 1 at a position opposing the supporting portion 11e relative to the terminal 13. The first protrusion 11c can be fitted to or removed from the concave portion 14 when the cover 11 is displaced to the closed position. Although one concave portion 14 and one first protrusion 11c are provided in the present embodiment, a plurality of concave portions 14 and first protrusions 11c may be provided. Further, the first protrusion 11c is disposed at the center of the end side of the sliding member 11b in the present embodiment, but the first protrusion 11c may be disposed at a position other than the center. Furthermore, the length of the concave portion 14 and that of the protrusion 11c are not limited to those shown in FIG. 2. For example, the first protrusion 11c may be formed to have substantially the same length as the end side of the sliding member 11b and the length of the concave portion 14 may be adjusted accordingly.

Hereinafter opening/closing of the cover 11 will be described.

Figure 3A:
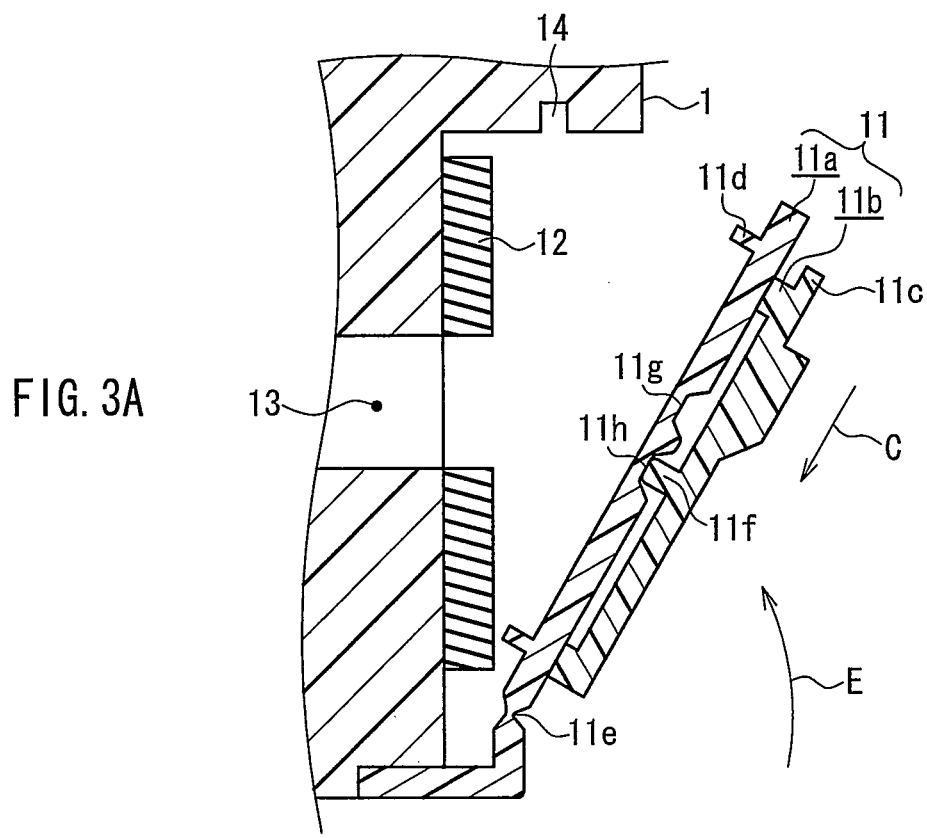
FIG. 3A is a cross-sectional view of principal components of a cover and those in the vicinity of the cover when the cover is open.
Figure 3B:
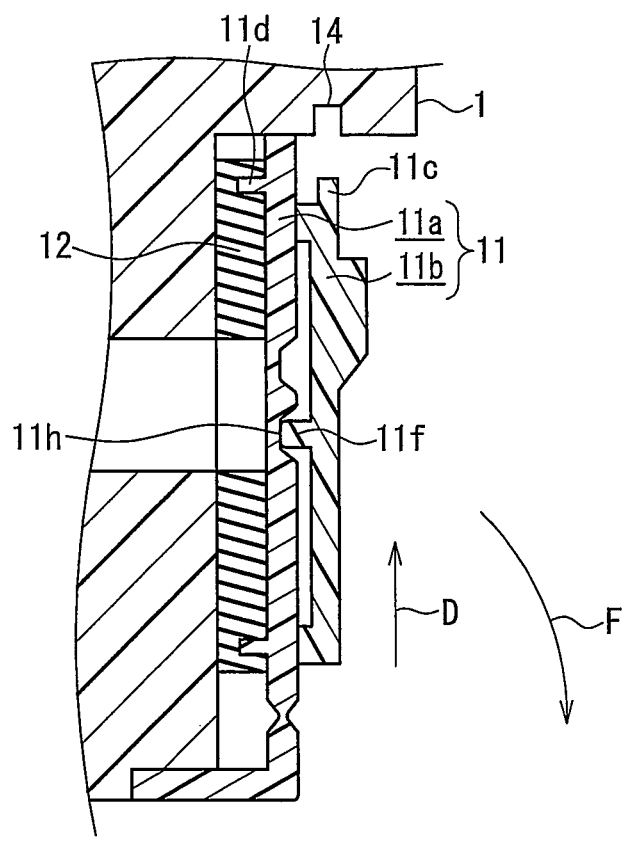
FIG. 3B is a cross-sectional view of principal components of the cover and those in the vicinity of the cover when the cover is closed.
Figure 3C:
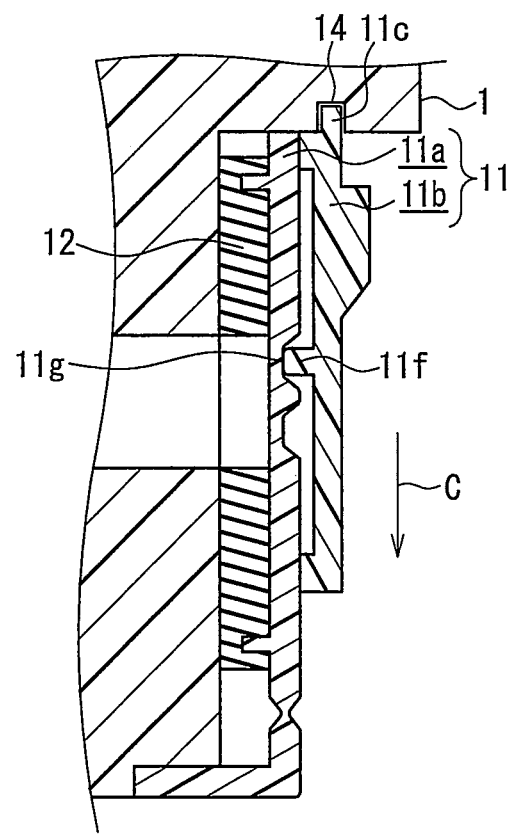
FIG. 3C is a cross-sectional view of principal components of the cover and those in the vicinity of the cover when the cover is locked.

FIG. 3A a cross-sectional view of the cover 11 when it is at the open position. FIG. 3B is a cross-sectional view of the cover 11 when it is at the closed position. FIG. 3C is a cross-sectional view of the cover 11 when it is at the closed position and is locked.

When displacing the cover 11 to the closed position from the open position shown in FIG. 3A, first, the sliding member 11b is displaced to a retracted position as shown in FIG. 3A. When displacing the cover 11 to the closed position from the open position, unless the sliding member 11b is not displaced to the retracted position, the first protrusion 11c may come into contact with the first housing 1 or the like, causing difficulty in displacing the cover 11 to the closed position.

Here, the sliding member 11b is slidable between the retracted position shown in FIG. 3A and a protruded position shown in FIG. 3C. The sliding member 11b includes a second protrusion 11f on its surface opposing the cover portion 11a. Further, the cover portion 11a includes a first concave portion 11g and a second concave portion 11h on its surface opposing fee sliding member 11b. When the sliding member 11b is at the retracted position shown in FIG. 3A, the second protrusion 11f is fitted to the second concave portion 11h to position the sliding member 11b. Further, when the sliding member 11b is at the protruded position (FIG. 3C), the second protrusion 11f is fitted to the first concave portion 11g to position the sliding member 11b.

Next, the cover 11 is displaced in the direction indicated by the arrow E. At this time, the cover 11 is supported by the supporting portion 11e and is displaced in the direction indicted by the arrow E.

As shown in FIG. 3B, the cover 11 is displaced to a position at which the rib 11d comes into contact with the waterproofing member 12. In the present embodiment, the cover 11 is displaced to the position at which the rib 11d comes into contact with the waterproofing member 12. However, since the waterproofing member 12 has elasticity, the waterproofing member 12 preferably is pressed and deformed by the rib 11d and has such a thickness that the rib 11d can be buried in the waterproofing member 12. That is, the rib 11d preferably can be buried in the waterproofing member 12. As a result, the contact between the rib 11d and the waterproofing member 12 further improves, thereby further ensuring the waterproofness. That is, the rib 11d and the waterproofing member 12 may come into contact with each other to an extent that does not involve deformation of the waterproofing member 12. In this case, however, if microscopic asperities are present on the surface of the waterproofing member 12 with which the rib 11b comes into contact or the rib 11d and the waterproofing member 12 come into contact with each other without being parallel to each other when the cover 11 is closed, microscopic gaps develop between the rib 11d and the waterproofing member 12. Thus, there is a chance that liquid enters the terminal 13 through the gaps. In the present embodiment, the waterproofing member 12 is made of an elastic material and the rib 11d presses and deforms the waterproofing member 12 when the cover 11 is displaced to the closed position. As a result, gaps hardly develop between the rib 11d and the waterproofing member 12. Accordingly, even if microscopic asperities are present on the surface of the waterproofing member 12 with which the rib 11d comes into contact or the rib 11d and the waterproofing member 12 come into contact with each other without being parallel to each other when the cover 11 is closed, the waterproofness can be ensured.

Although, the present embodiment has been described on the premise that the cover 11 is provided with the rib 11d, the rib 11d is not essential. Even with the cover 11 not provided with the rib 11d, a sufficient degree of waterproofing can be achieved if the contact between the cover 11 and the waterproofing member 12 can be improved.

Further, the cover portion 11a is made of a material having at least hardness sufficient to withstand the resilience of the waterproofing member 12.

Next, as shown in FIG. 3C, the sliding member 11b is displaced in the direction indicated by the arrow D to fit the first protrusion 11c into the concave portion 14. At this time, the second protrusion 11f is fitted to the first concave portion 11g, so that the sliding member 11b is positioned at the protruded position. For this reason, even if a force is applied to the cover 11 in the direction indicated by the arrow F, since the first protrusion 11c is fitted to the concave portion 14, the cover 11 does not get deformed in the direction indicated by the arrow F.

Next, when displacing the cover 11 to the open position from the closed position shown in FIG. 3C, first, the sliding member 11b is displaced in the direction indicated by the arrow C to remove the first protrusion 11c from the concave portion 14. The sliding member 11b is displaced in the direction indicated by the arrow C to a position at which the second protrusion 11f is fitted to the second concave portion 11h (see FIG. 3B). Next, the cover 11 is rotated in the direction indicated by the arrow F and is displaced to the open position shown in FIG. 3A.

Although the terminal portion 10 shown in FIGS. 2 and 3A to 3C includes one terminal 13, it may include a plurality of terminals.

Figure 4:
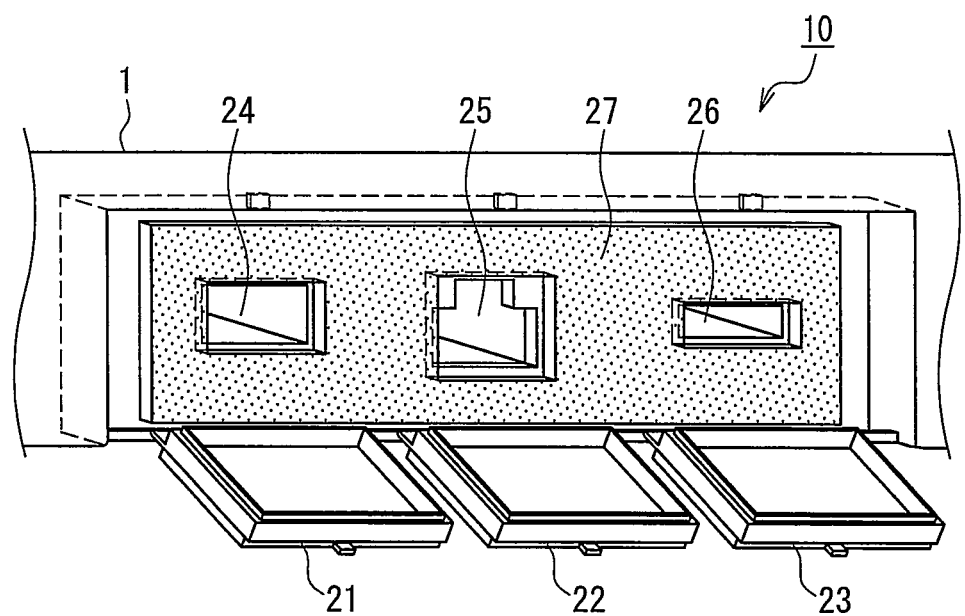
FIG. 4 is a cross-sectional view of principal components showing a modified example of the terminal portion.

FIG. 4 is a perspective view of the terminal portion 10 in a modified example. The terminal portion 10 shown in FIG. 4 includes three terminals (first terminal 24, second terminal 25, third terminal 26). A first cover 21 is placed in the vicinity of the first terminal 24, a second cover 22 is placed in the vicinity of the second terminal 25, and a third cover 23 is placed in the vicinity of the third terminal 26. The covers 21 to 23 each are supported rotatably with respect to the first housing 1. Each of the covers 21 to 23 is independently rotatable. Since the detailed configuration of the covers 21 to 23 is the same as that of the cover 11 shown in FIG. 2, the detailed description of their configuration will not be repeated.

A waterproofing member 27 is placed in the vicinity of the terminals 24 to 26. The waterproofing member 27 is placed so as to surround each of the terminals 24 to 26. Through holes are formed in the waterproofing member 27 at positions corresponding to the terminals 24 to 26. That is, the single waterproofing member 27 can prevent liquid from entering the terminals 24 to 26. Since the detailed configuration and the material of the waterproofing member 27 are the same as those of the waterproofing member 12 shown in FIG. 2, the detailed description thereof will not be repeated.

For the terminal portion shown in FIG. 4, the way the covers 21 to 23 rotate and the structure for rendering the terminals 24 to 26 waterproof are the same as those described with reference to FIGS. 2 and 3A to 3C. Thus, the detailed description thereof will not be repeated.

As shown in FIG. 4, even in the case where a plurality of terminals are provided, the single waterproofing member can render all of the terminals waterproof. Thus, as compared with the configuration in which waterproofing members are provided independently for respective terminals, the number of components can be reduced and thereby the cost can be reduced. Further, since only one waterproofing member needs to be bonded during the waterproofing member bonding step at the time of assembling the first housing 1, the number of steps can be reduced.

3. Effects of Embodiment, Etc.

According to the present embodiment, because the waterproofing member 12 is provided on the first housing 1 side, the notebook computer can be reduced in size. Hereinafter, the description will be given of the reasons why the notebook computer can be reduced in size.

If the waterproofing member is provided on the cover and the rib is provided on the first housing side, the rib to be formed around a terminal has to have a large opening area with consideration given to the thickness of an insulating cover at least covering a part of a plug to be connected to the terminal. An increase in the opening area of the rib leads to an increase in the size of the terminal portion, which leads to an increase the size of the first housing 1. For cables such as a USB cable, a power cable and a LAN cable, generally, a holding portion (portion where a part of the plug portion and a part of the conductor are covered with a thick insulating cover) placed between a plug portion (portion that is connected to the terminal electrically) and a cable portion (portion where the conductor is coated and insulated) is larger in thickness then the plug portion. Thus, when the rib is provided on the first housing side, the opening area of the rib increases.

In contrast, when the rib 11d is provided on the cover 11 as in the present embodiment, it is not necessary to give consideration to the thickness of the holding portion of the cable when determining the opening area of the rib 11d. That is, the rib 11d needs to at least come into contact with the waterproofing member 12 when the cover 11 is displaced to the closed position. Thus, the waterproofing member 12 can be disposed near the terminal 13. As a result, the size of the terminal portion 10 can be reduced and the size of the first housing 1 also can be reduced. Further, even if the opening area of the rib 11d is reduced, the rib 11d still can come into contact with the waterproofing member 12. By reducing the opening area of the rib 11d, it is possible to reduce the size of the cover 11.

Further, the waterproofing member is provided on the terminal side in the present embodiment. Thus, even if the number of terminals increases as shown in FIG. 4, the single waterproofing member 27 can render all of the terminals 24 to 26 waterproof. That is, in the case of providing the waterproofing member on the cover, it is necessary to provide the waterproofing members as many as the terminals (the number of covers), which leads to an increase in the number of components. This results not only in an increase in the cost but also in an increase in the number of waterproofing member bonding steps at the time of assembling the notebook computer. In the present embodiment, on the other hand, the waterproofing member is provided on the terminal side. Thus, regardless of the number of terminals, the single waterproofing member can render all of the terminals waterproof. Therefore, the number of components can be reduced and thereby the cast can be reduced. Further, when assembling the notebook computer, only one waterproofing member needs to be bonded during the waterproofing member bonding step regardless of the number of terminals. Thus, the assembly workability can be improved.

Further, in the present embodiment, when the cover portion 11a is at the closed portion shown in FIG. 3C, it applies pressure in the direction perpendicular to the surface with which the cover portion 11a and the waterproofing member 12 come into contact. As a result, the contact between the cover portion 11a and the waterproofing member 12 can be improved, so that waterproofing can be improved with certainty.

Although the waterproofing members 12 and 27 in the present embodiment are made of silicone foam, they can be made of any material as long as it has elasticity and is capable of preventing the entry of liquid. The waterproofing members 12 and 27 preferably are made of a monolithic material in order to ensure the waterproofness. The waterproofing member 12 and 27 may be made of silicone rubber, nitrite rubber, etc., so as to provide them with elasticity.

Further, in the present embodiment, the waterproofing members 12 and 27 are not only capable of preventing the entry of moisture as their name "waterproofing" suggests. That is, the waterproofing members in the present embodiment are capable of preventing the entry of not only water but also a variety of liquids and solids. The waterproofing members are waterproof and dustproof, so that they can prevent liquid, foreign matter, etc., from entering the terminal portion to cause a short circuit in the terminal portion.

Further, in the present embodiment, the sliding member 11b is provided and the first protrusion 11c is fitted to the concave portion 14 to position the cover 11 at the closed position. However, it is not necessary for the cover 11 to be positioned in such a manner. In addition to the positioning of the cover 11 described in the present embodiment, an elastic member to which the cover 11 can be press fitted is provided in the vicinity of the terminal of the first housing and the cover 11 is press fitted to and held by the elastic member.

Further, the notebook computer has been described in the present embodiment as one example of the electronic device. However, any device at least provided with a cover capable of covering a portion to be covered may be used as the electronic device. The characteristic of the embodiment can be applied to a variety of terminals provided for, for example, mobile phone terminals, portable game machines and digital cameras. Furthermore, the characteristic of the embodiment can also be applied to a battery-housing portion of a portable device in which a battery can be housed.

Figure 5:
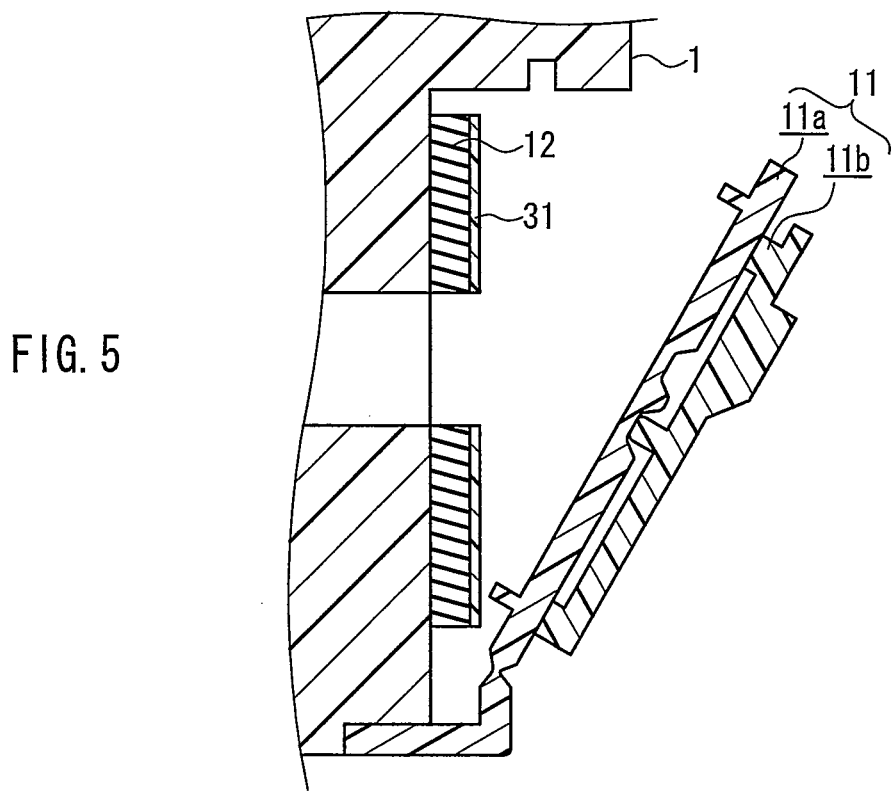
FIG. 5 is a cross-sectional view of principal components showing a modified example of the waterproofing member.

In the present embodiment, the waterproofing member made of silicon foam is provided. Generally, silicone foam is not so resistant to an external impact. Thus, if a user accidentally bumps the tip of a plug against the waterproofing member in the vicinity of the terminal when attaching the plug to the terminal, the waterproofing member could be damaged. Particularly, with plugs made of metal or those having a sharp shape such as a USB cable, there is a high possibility of the waterproofing member being damaged. Therefore, as shown in FIG. 5, a protection film 31 is preferably provided on the surface (surface opposing the cover 11 when the cover 11 is closed) of the waterproofing member 12. The protection film 31 is preferably made of a soft resin that is less likely to be damaged even if an external impact is applied thereto. The strength becomes higher as the thickness of the protection film 31 increases. However, in view of the space between the first housing 1 and the cover 11, the thickness of the protection film 31 in the present embodiment is set to 0.5 mm, for example.

In the configuration shown in FIG. 4, a plurality of terminals are provided on one surface of the first housing 1 (side face 1b in FIG. 4). Even for a plurality of terminals provided on a plurality of surfaces of the first housing 1, a single waterproofing member can render them waterproof as in the present embodiment.

Further, the cover portion 11a or the sliding member 11b is preferably made of a material having flexibility. That is, when the sliding member 11b is displaced in the direction indicated by the arrow C or D, the second protrusion 11f hits the raised portion between the first concave portion 11g and the second concave portion 11h. At this time, if the cover portion 11a or the sliding member 11b is made of a flexible material, the raised portion between the first concave portion 11g and the second concave portion 11h or the second protrusion 11f deforms. Thus, the sliding member 11b can be displaced smoothly in the direction indicated by the arrow C or D. The cover 11a or the sliding member 11b is preferably made of a soft resin, particularly preferably an elastically-deformable soft resin having elasticity (e.g., polybutylene terephthalate resin, nitrile rubber, silicone rubber). Further, as a result of the cover portion 11a being made of a flexible material, the supporting portion 11e integral to the cover portion 11a becomes flexible. As a result of the supporting portion 11e becoming flexible, the supporting portion 11e can be prevented from getting damaged from fatigue even if the cover 11 is opened/closed repeatedly.

Further, the supporting portion 11e may be provided with a spindle for supporting the cover portion 11a rotatably in the directions indicated by the arrows E and F.

Further, the first concave portion 11g and the second concave portion 11h may be provided not only on the surface of the cover portion 11a facing the sliding member 11b but also on a portion where the cover portion 11a and the sliding portion 11b at least come into contact with each other.

Further, the rib 11d is not essential. When not providing the rib 11d, it is preferable to bring the surface of the cover portion 11a facing the waterproofing member 12 to surface contact with the waterproofing member 12. Further, when brining the cover portion 11a into contact with the waterproofing member 12, it is preferable that the cover portion 11a deforms the waterproofing member 12 by compression because the contact between the cover portion 11a and the waterproofing member 12 can be improved and waterproofing can be improved with certainty.

The first housing 1 according to the present embodiment is one example of the housing of the present application. The cover 11 according to the present embodiment is one example of the cover of the present application. The waterproofing member 12 according to the present embodiment is one example of the waterproofing member of the present application. The protection film 31 according to the present embodiment is one example of the protection member of the present application.

The electronic device disclosed in the present application is useful as a device provided with a cover capable of covering a portion to be covered.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic device comprising:
   a housing comprising an outer wall, an opening is being defined in a face of the outer wall, and a user input by which a user can input information;
   a cover mounted to the outer wall and movable between a first position covering the opening and a second position exposing the opening, and comprising a rib extending from a first face of the cover that faces toward the outer wall in the first position; and a deformable waterproofing member having elasticity, bonded to the outer wall and around the perimeter of the opening, wherein first and second openings and first and second of said covers are present on the outer wall, the first of said covers being provided for the first of said openings and the second of said covers being provided for the second of said openings, said deformable waterproofing member is a single member provided around the perimeters of the first and second openings, the first and second covers are adjacent each other in a direction parallel to the face of the housing, the waterproofing member is separated from the first and second covers when the first and second covers are at the second position, the rib deforms the waterproofing member when the first and second covers are at the first position, and the housing comprises a top surface on which the user input is provided, a bottom surface opposite the top surface, and a side surface extending between the top surface and the bottom surface, and the opening is provided on the side surface, the electronic device further comprising a display unit case pivotably connected to the housing by a hinge mechanism.

2. The electronic device according to claim 1, wherein the waterproofing member comprises silicone foam.

3. The electronic device according to claim 2, wherein the waterproofing member comprises a protection member on a surface of the silicone foam.

4. An electronic device comprising:

a housing comprising an outer wall, an opening is being defined in a face of the outer wall, and a user input by which a user can input information;

a cover mounted to the outer wall and movable between a first position covering the opening and a second position exposing the opening, and comprising a rib extending from a first face of the cover that faces toward the outer wall in the first position; and a deformable waterproofing member having elasticity, bonded to the outer wall and around the perimeter of the opening, wherein first and second openings and first and second of said covers are present on the outer wall, the first of said covers being provided for the first of said openings and the second of said covers being provided for the second of said openings, said deformable waterproofing member is a single member provided around the perimeters of the first and second openings, the first and second covers are adjacent each other in a direction parallel to the face of the housing, the waterproofing member is separated from the first and second covers when the first and second covers are at the second position, the rib deforms the waterproofing member when the first and second covers are at the first position, the housing comprises a top surface on which the user input is provided, a bottom surface opposite the top surface, and a side surface extending between the top surface and the bottom surface, and the opening is provided on the side surface, and the cover comprises a second face opposed to the first face, and a moveable lock member on the second face.

5. The electronic device according to claim 4, wherein the lock member is slidable relative to the second face and movable between a third position where the lock member is engaged with the housing to maintain the cover in the first position and a fourth position allowing the cover to be moved to the second position.

6. The electronic device according to claim 5, wherein the side surface of the outer wall of the housing defines the bottom surface of a cavity having a cavity sidewall, the opening and the waterproofing member are disposed on the bottom surface of the cavity, and the lock member is engageable with the cavity sidewall to maintain the cover in the first position.

7. The electronic device according to claim 6, wherein the cover further comprises a holding member that maintains the locking member in the third position.

8. The electronic device according to claim 7, wherein the holding member comprises a groove in the second face of the cover and a protrusion on the locking member that faces the second face of the cover.

9. The electronic device according to claim 6, wherein a concavity is present in the cavity sidewall that accepts the locking member in the third position.

10. The electronic device according to claim 5, wherein the cover is mounted for pivoting movement relative to the housing.

11. An electronic device comprising:

a housing comprising an outer wall, an opening is being defined in a face of the outer wall, and a user input by which a user can input information;

a cover mounted to the outer wall and movable between a first position covering the opening and a second position exposing the opening, and comprising a rib extending from a first face of the cover that faces toward the outer wall in the first position; and a deformable waterproofing member having elasticity, bonded to the outer wall and around the perimeter of the opening, wherein first and second openings and first and second of said covers are present on the outer wall, the first of said covers being provided for the first of said openings and the second of said covers being provided for the second of said openings, said deformable waterproofing member is a single member provided around the perimeters of the first and second openings, the first and second covers are adjacent each other in a direction parallel to the face of the housing, the waterproofing member is separated from the first and second covers when the first and second covers are at the second position, and the rib deforms the waterproofing member when the first and second covers are at the first position, the housing comprises a top surface on which the user input is provided, a bottom surface opposite the top surface, and a side surface extending between the top surface and the bottom surface, and the opening is provided on the side surface, and the opening comprises a terminal for connection to a cable.

* * * * *